Nov. 22, 1938.   O. F. NELSON   2,137,303
SEAL
Filed April 6, 1936   4 Sheets-Sheet 1
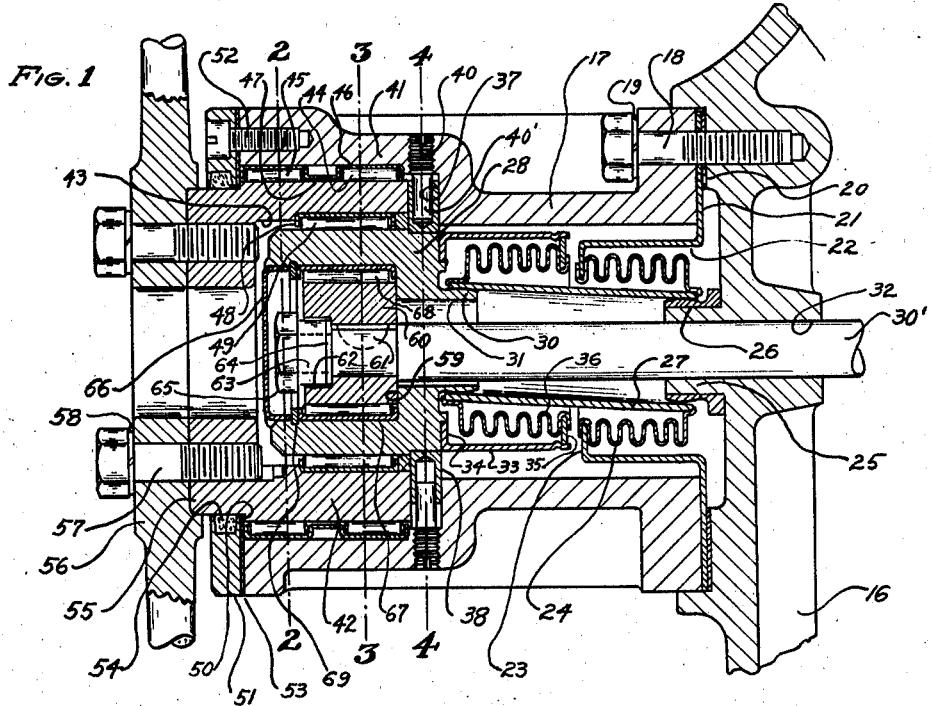
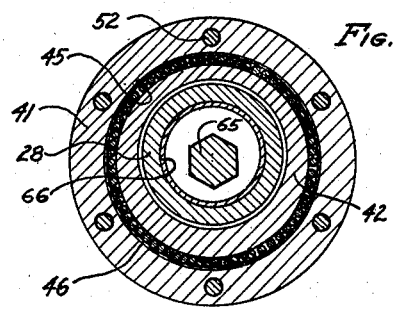
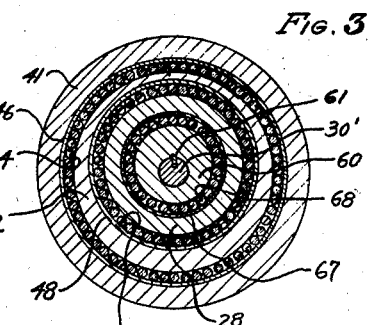
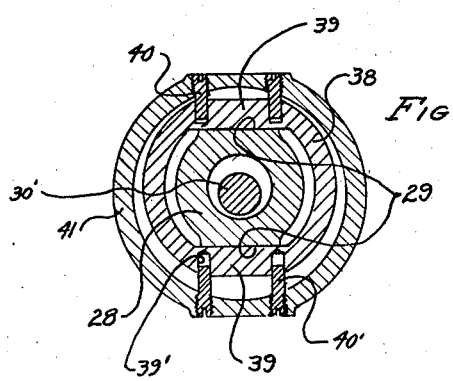

Nov. 22, 1938.  O. F. NELSON  2,137,303
SEAL
Filed April 6, 1936   4 Sheets-Sheet 2
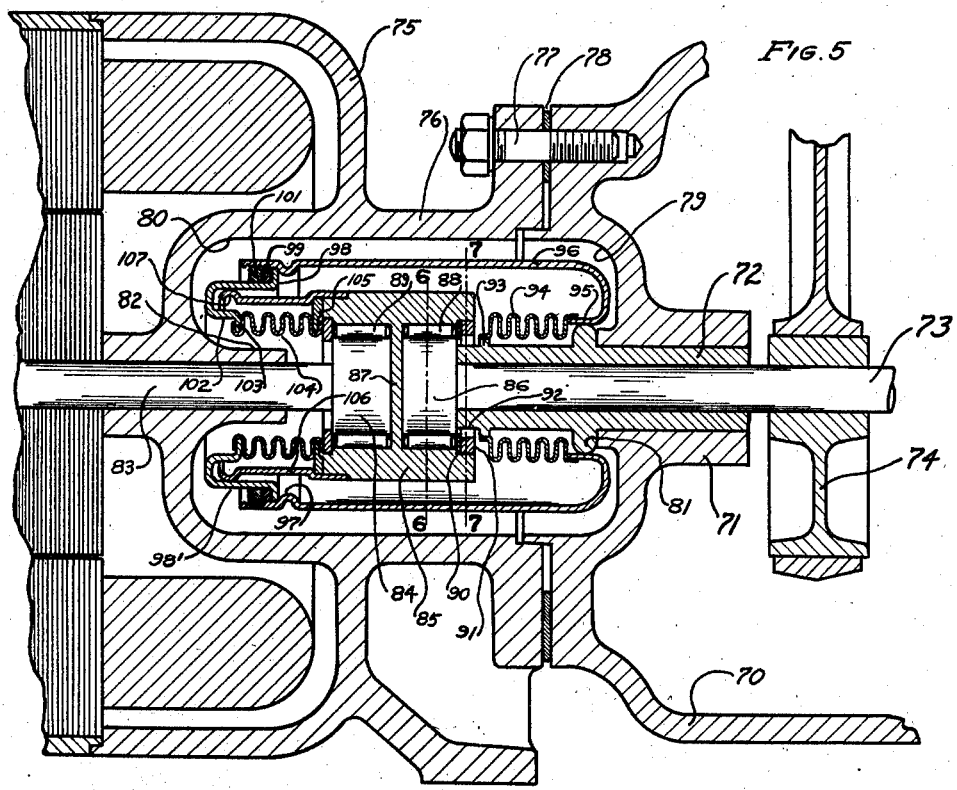
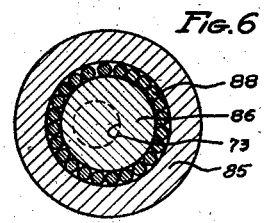
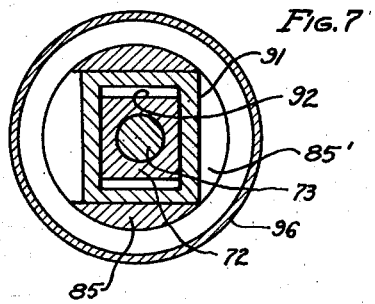
INVENTOR.
Owen F. Nelson
BY
ATTORNEY.

Nov. 22, 1938.  O. F. NELSON  2,137,303
SEAL
Filed April 6, 1936    4 Sheets-Sheet 3

Nov. 22, 1938.  O. F. NELSON  2,137,303
SEAL
Filed April 6, 1936  4 Sheets-Sheet 4

INVENTOR.
Owen F. Nelson
BY
ATTORNEY.

Patented Nov. 22, 1938

2,137,303

UNITED STATES PATENT OFFICE 2,137,303

SEAL

Owen F. Nelson, Detroit, Mich.

Application April 6, 1936, Serial No. 72,888

10 Claims. (Cl. 286—11)

My invention relates to a new and useful improvement in a seal adapted for sealing around shafts and similar bodies for preventing escape of gases or liquids around the shaft and is particularly adapted for use in pumping and compressing mechanisms used in mechanical refrigerators.

An object of the invention is the provision of a sealing mechanism whereby an hermetic seal is afforded around the shaft.

Another object of the invention is the provision of a seal of this class which will be simple in structure, economical of manufacture, durable, compact, easily and quickly installed, and highly efficient in use.

Another object of the invention is the provision in combination with a refrigerator compressor of a seal so arranged and constructed that an hermetic seal would be provided without permitting access of the gases to its motor or its windings.

Another object of the invention is the provision of a seal of this class in which a flexible sealing member may be mounted in embracing relation on the shaft around which the seal is effected and operatively connected with another flexible sealing member similarly sealed and so interconnected as to cooperate with each other in the sealing.

Another object of the invention is the provision of a sealing mechanism embodying a flexible sealing member connected at both ends in sealing relation to a body and embracing the shaft and so constructed and arranged and adapted to cooperate with another similarly constructed sealing member as to reduce the movement and distortion in each and in both of the members to a minimum.

Another object of the invention is the provision of a sealing mechanism in which a flexible member may be used for sealing and provided with a mounting whereby, while one end of the sealing member is held in fixed relation, the other end has imparted to it a force which will move the said end of the sealing member to effect a weaving oscillating movement.

Another object of the invention is the provision of a sealing mechanism comprising a flexible sealing member fixed at one end and attached at its opposite end in sealing relation to a movable body and so arranged and constructed that as distortion or movement of the end of the sealing member is effected at one side, the opposite side of the body will move in an opposite direction, thus preventing the bodily movement of the sealing member relatively to its fixed end.

Another object of the invention is the provision of a shaft having embracing and enclosing sealing members extended over a portion of said shaft and provided at one end with an enclosing sealing member and also provided at said end with means for driving the shaft without disturbing or destroying the seal of said sealing member.

It is another object of the present invention to provide a shaft with means for entirely enclosing said shaft and with means for driving said shaft while at the same time providing means for sealing the shaft against leakage of gases or liquids around the same.

It is another object of the present invention to provide in a seal of this class of a pair of flexible cooperating sealing members.

Other objects will appear herinafter.

The invention consists of the combination and arrangement of parts hereinafter described and claimed.

The invention will be best understood by a reference to the accompanying drawings which form a part of this specification, and in which:

Fig. 1 is a longitudinal, central, vertical, sectional view of my invention showing it applied.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

Fig. 5 is a longitudinal, central, vertical, sectional view of a slightly different form of the invention.

Fig. 6 is a sectional view taken on line 6—6 of Fig. 5.

Fig. 7 is a sectional view taken on line 7—7 of Fig. 5.

Figure 8:
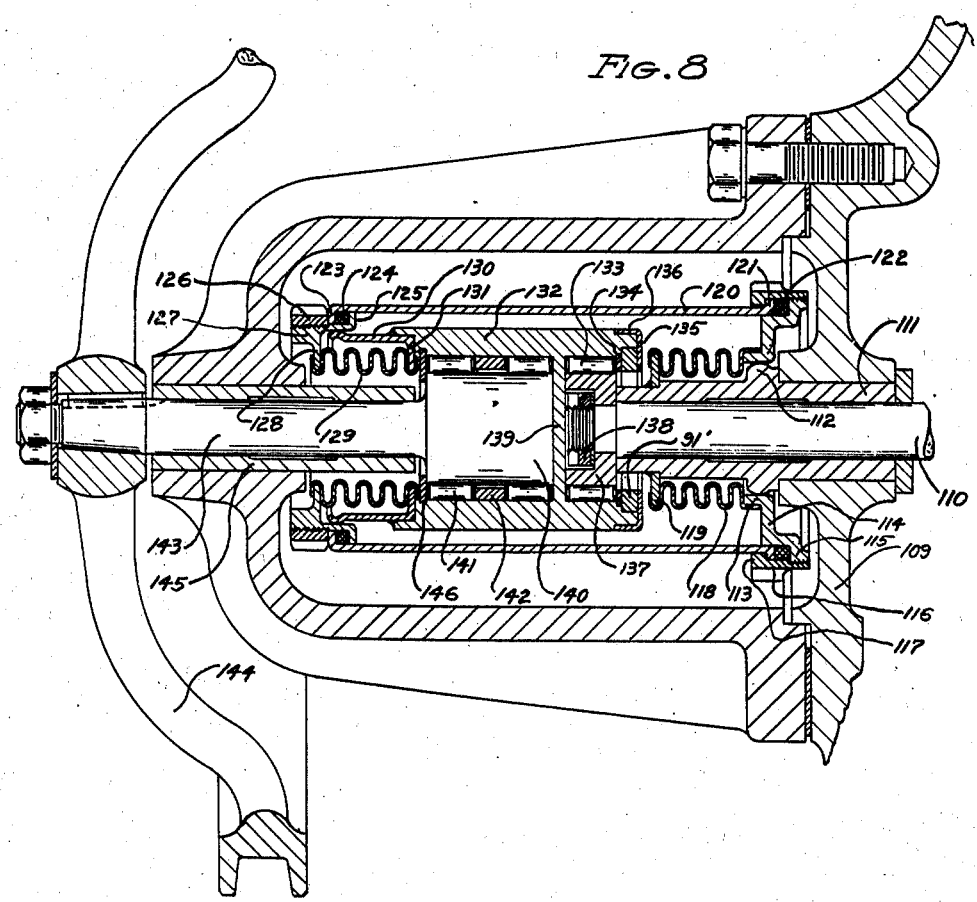
Fig. 8 is a longitudinal, central, vertical, sectional view of the invention showing a further modified form thereof.

In Fig. 1 I have illustrated the invention used in conjunction with a housing side wall 16 or the like to which is attached the sleeve or housing 17 by means of bolts 18 carrying the spring washers 19. Positioned between the housing 17 and the wall 16 is a suitable gasket 20 which bears against the radially turned flange 21 carried by the metallic sleeve or cylinder 22. The opposite end of the sleeve or cylinder 22 is provided with the radially inwardly turned flange 23 to which is secured, by welding, soldering or in any other suitable manner, one end of the tubular bellows 24 which is formed from any suitable flexible material and preferably metal. Projecting inwardly from the wall 16 is a boss 25 embracing which is a bushing 26 provided with the curvilinear or spherical periphery against which engages one end of the cylindrical sleeve 27. To one end of this sleeve 27 is secured, by welding, soldering or in any other suitable manner, the opposite end of the bellows 24. Positioned within the housing 17, adjacent its outer end, is a driving head 28 which is preferably formed cup-shaped and which is provided, adjacent its inner end, with the flat surfaces 29. This head 28 is also provided with the nipple 30 projecting outwardly from the base thereof and so surrounding an opening which is formed concentric in the base. The periphery of the nipple 30 is formed curvilinear and the opposite end of the sleeve 27 embraces and engages against this curvilinear surface of the nipple 30. The bore 31, formed through the nipple 30 and through the base is of larger diameter than the diameter of the shaft 30' which extends through this opening. This shaft 30' also extends through the opening 32 formed in the wall 16 and through the boss 25, the wall 16 and the boss 25 forming a bearing for the shaft 30'. A cylindrical sleeve 33 is provided at one end with the radially inwardly projecting flange 34 which rests against and is secured to, by welding, soldering or in any other suitable manner, the inner face of the driving head 28. The opposite end of the sleeve 33 is welded or otherwise suitably secured to the annular member 35 which thus provides a radially inwardly projecting flange. To this annular member 35 is secured, by welding or otherwise, one end of a flexible bellows-like tubular member 36, the opposite end of which is welded or otherwise suitably secured to the end of the sleeve 27.

Formed in the outer end of the housing 17 is a recess 37, in the inner side of which is slidably positioned the yoke 38 having the oppositely positioned cordally extended bar forming members 39 which engage against the flat surfaces 29 of the driving head 28. Threaded into the housing 17 are screws 40 having the unthreaded stud forming ends 40', which extend into sockets 39', formed in the parts 39. While the screws 40 prevent rotation of the member 38 the member 38 is capable of radial movement, the member 38 being of less outside diameter than the inside diameter of the recess 37. As clearly shown in Fig. 4, while the parts 39 always rest snugly on the flat surfaces 29, the member 38, at the sides of the member 28, is spaced therefrom, so that the member 28 may move laterally relatively to the member 38 and may also move vertically by carrying the member 38 with it within the limits permitted by the recessed portion 41 of the housing 17.

Positioned in the recess 37 of the housing 17 is a driving collar 42 recessed as at 43 and adapted at its periphery to engage the roller bearings 44 and 45 which bear against the liner 46 mounted in the portion 41 of the housing 17. This liner is pressed inwardly at its center to provide a separating rib 47 to retain the rollers 44 and 45 in separated relation. The opposite ends of the liner 46 are bent inwardly to provide inwardly extending retaining flanges which bear against the outer ends of the rollers or pins 44 and 45. Pressed into a suitable recess in the inner surface of the driving collar 42 is a liner 48 having its ends turned inwardly to provide a raceway for the roller bearings or pins 49 which engage the periphery of the driving head 28. This driving collar 42 is provided with a shoulder 50 against which bears the gasket 53 held by the retaining ring 51 through which are extended bolts 52 threaded into the end of the housing 17. The inner surface of this ring 51 is recessed to provide space for reception of packing 54.

A suitable traveling wheel or pulley 56 is mounted on the portion 55 of the housing 17 by means of the bolts 57 and spring washers 58.

In the interior 59 of the cup-shaped head 28 is positioned the eccentric 60 which is fixedly mounted on the end of the shaft 30' and keyed thereto by the key 61. This eccentric 60 is provided with the recess 62 for reception of the spring washer 64 and the neck 63 of the nut 65 which is threaded onto the end of the shaft 30'. It will be noted that the exterior surface of the nut 65 is within the head 28 and the outer end of this head 28 is closed by the cup-shaped cap 66 which is inserted therein and engaged against the washer 69 and welded, soldered, or otherwise permanently secured in position. The eccentric 60 rides upon the roller bearings or pins 68 which bear against the liner 67 positioned within the head 28 and having the edges thereof turned inwardly to provide retaining flanges.

The construction is such that when the pulley 56 is rotated, and this pulley is rotated from a suitable source of power, the driving collar 42 will rotate. The driving collar 42 is concentric with the shaft 30'. The recess 43 however, in the driving collar 42 is eccentric and the driving head 28 is positioned eccentric to the driving collar 42. The driving head 28 is also eccentric to the shaft 30'. As the driving collar 42 is rotated this collar 42 will rotate about the driving head 28 in as much as the driving head is prevented from rotating by the yoke 38. The head 28 will, therefore, be oscillated or caused to travel in an orbit and the traveling of the head 28 in an orbit will effect a rotation of the shaft 30' through the eccentrically mounted member 60. Thus, it will be noted that the shaft 30' will rotate in unison with and at the same speed as the pulley 56 while the member 28 will not be rotating. The member 28 in its movement will effect a rocking of the sleeve 27 on the periphery of the member 26. The nipple 30, of course, moving with the head 28 will carry the end of the sleeve 27 which rests upon the nipple 30 with it so that this end of the sleeve 27 will also travel in an orbit but about a fixed point which is determined through the engagement of the sleeve 27 with the member 26. As the nipple 30 travels in its orbit, since one end of the flexible sealing member 36 is fixed, the opposite end thereof, which is attached to the end of the sleeve 27, will be caused to travel in this orbit. It will be noted that as this movement continues, the sleeve 27 will assume various positions relatively to the axis of the shaft 30' and thus the radially extending portions of the sealing member 36 will be flexed into various positions of inclination relatively to the axis 30'. Thus, there is imparted to the sealing member 36 at its upper end a floating movement which affects the member 36 in such a manner that the radially extended parts are also moved relatively to the axis of the shaft 30'. It will be noted, however, that this radial variation of the member 36 relatively to the axis 30' is complementary at diametrically opposite parts and in opposite directions so that the end of the member 36 may be said to undergo a rolling tilting movement. While the sealing member 36 is going through this movement the sealing member 24 is also effected but the motion transmitted to the member 24 is only transmitted thereto by the sleeve 27. The end of the sealing member 24 which is attached to the sleeve 27 has imparted thereto a motion which may be described as a tilting rolling motion. This end of the sealing member 24 does not travel in an orbit in as much as the end of the sleeve 27, which engages the member 26, does not travel in an orbit but merely rocks around the member 26. In this manner the movement imparted to the sealing member 24 differs from the movement imparted to the sealing member 36. While the sealing member 36 has the rolling, tilting movement which is common to the sealing member 24, the free end of the member 36 also has a movement in addition, in as much as it travels in an orbit. Consequently, it is seen that I use a pair of flexible sealing members which are separated from each other, each of which is fixed at one end and floating at the opposite end. In this manner the distortion and the movement imparted to the sealing member is divided, a portion being transmitted through the sleeve 27 to the sealing member 24 and the rest being taken up in the sealing member 36. Experience has shown that were a single sealing member to be used, fixed at one end and floating at its opposite end, and spanning the entire distance, while an effective seal would be provided, it would be practically impossible, with known materials, to construct a practical operative device which would be sufficiently durable. This is due to the fact that in such an event the entire movements would be transmitted through a single body instead of two bodies and but a single floating end would be available. Moreover, if a single floating end is to be used and a proper seal effected, the floating end would not be floating to the extent that it would be practicable. For instance, were one end of a sealing member such as 36 to be attached to the inner face of the driving head 28 and this sealing member extended at its opposite end to the face of the wall 16, the shaft 30' would be enclosed in a suitable seal but as the floating end, that is the end which would be attached to the member 28, would be carried in its orbit this end could not adjust itself to the various positions into which it would be carried as it would be fixed to the face of the head 28. In the present form, the free end of the sealing member 36 functions entirely differently than it would were it fastened to the face of the driving head 28 in that as it is carried into its various positions, it is self-adjusting relatively to its fixed end. This is due to the slip fit of the tube 27 on the bearing surface of the nipple 30 which permits the tilt of the cross section planes of the member 36 relatively to the axis of the shaft 30' or relatively to the plane of the fixed end of the member 36. In this way, the cross sectional plane of the free end of the seal member 36 is not fixed relatively to the cross sectional plane of the fixed end of the sealing member 36. The same is true of the sealing member 24. The cross sectional plane of the free end of this sealing member may tilt relatively to the cross sectional plane of the fixed end and it is this mounting that permits the free tilting rolling movement. The connection of the sealing members 36 and 24 to the tube 27 permits this movement which is evidenced by the tilting rolling action, while at the same time an effective seal is provided.

It is believed obvious that in the structure shown in Fig. 1 I have provided a gas or liquid tight seal as the gas or liquid following through the wall 16 around the shaft 30' could enter the sleeve 27 from which it might pass to the exterior thereof at either end and there it would be contained within leak-proof chambers. Should the gas pass along the shaft 30' into the recess 59 formed in the driving head 28, it could not escape from this recess in as much as the cap 66 would seal against its escape.

In this manner, by using the drive indicated, I have entirely enclosed in a gas proof seal the driven shaft and yet have provided means for driving this shaft without utilizing any shaft extended parallel or in alignment to the shaft 30' and without necessitating the use of cranks. This type of drive with a seal such as indicated affords a compact structure which is quite necessary in mechanical refrigerators.

In Fig. 5 I have shown a slightly different form of structure, but one in which the action of the sealing members referred to is again brought into play. In this form the housing 70 is provided on one of its end walls with a boss 71 through which extends the bushing 72 to form a bearing for the shaft 73 on which the pitman 74 is mounted. A motor housing and wall 75 is provided with the tubular extension 76 which is secured by the bolts 77 against the wall of the housing 70, a gasket 78 being interposed between these two parts. The recess 79 in the end wall of the housing 70 cooperates with the recess 80 in the extension 76 to provide a chamber in which the seal is effected. In this construction the shaft 73 forms the driven shaft and the driving shaft 83 is in substantial alignment therewith, this shaft 83 projecting through the boss 82 which serves as a bearing therefor. Fixedly mounted on the end of the shaft 83 is the eccentric roller 84 which is embraced by the collar 85. This eccentric roller or head 84 is spaced by the partition 87 which is preferably formed integral with the collar 85 from the eccentric roller or head 86 which is fixedly mounted upon the shaft 73. The roller 86 engages the roller bearings or pins 88 and the roller 84 engages the roller bearings or pins 89. The pins or roller bearings 88 are retained in position by the ring 90 against which engages the yoke 91. This yoke 91 embraces a portion of the bushing 72 which is formed rectangular in cross section to provide the flat faces 92. As shown in Fig. 7, the yoke may slide vertically on the flat faced portion of the bushing 72 and may move laterally in the cut away portions 85' of the collar 85. This yoke serves the function of preventing the rotation of the collar 85. A peripheral rib 81 projects radially outwardly from the bushing 72. Projecting outwardly from the bushing 72 at its inner end, is the radial rib 93 which is embraced by and to which is secured by welding or in any other suitable manner to provide a leak-proof seal, one end of the flexible sealing tube 94, the other end of which is welded to the inturned end of the sleeve 96, this inturned end 95 resting upon and rocking on the radial rib 81. Adjacent the opposite end of the tubular sleeve 96 is an inwardly pressed bead 97 which serves as an abutment for the outwardly extending flange 98 formed on the sleeve 98'. This flange is held against the bead 97 by means of the gasket 99 and the locking ring 101 which is threaded into this sleeve 96. This sleeve 98' is doubled upon itself to provide the inwardly projecting portion 102 and the radially inwardly projecting flange 103. Welded to this flange 103 is one end of the flexible sealing member 104, the other end of which is welded to the collar 105 which is secured to the collar 85. Secured at one end to the collar 85 is the sleeve 106, the other end of which is provided with the outwardly projecting bead 107 engaging the inner surface of the sleeve 98'. The member 105 will travel in an orbit when the shaft 83 is rotated so that the end of the sealing member 104 attached to the member 105 will travel in an orbit. The opposite end of the sealing member 104 will also travel in an orbit but will have a tilting rolling movement as the radially inwardly projected flange 103 may tilt relatively to the axis of the shaft 83. This tilting movement is, of course, transmitted through the sleeve 96 to the end of the sealing member 94 which is attached to the portion 95. This is substantially the same action as described for this sealing mechanism shown in Fig. 1.

In Fig. 8 I have shown a further modified form of construction in which the shaft 110 is projected through the bushing 111 which is positioned in a bore formed in the side wall of the housing 109. Projecting outwardly from the bushing 111 is the peripheral bead or rib 112 against which engages the collar 113 which embraces the same. Extending from this collar is the radial flange 114 provided with the axial flange 115 on which is threaded the retaining ring 116 having the inwardly projecting flange 117 which engages the outwardly projecting flange 121 formed on the sleeve 120 and serves to compress the packing and gasket 122. Secured at one end to the collar 113 is one end of the flexible sealing member 118, the other end of which is secured in sealing relation to the ring 119 which is mounted on the bushing 111 in embracing relation and projects radially outwardly therefrom. The sleeve 120 is provided with the inwardly turned flange 123 against which is compressed the packing or gasket 124 by means of the outwardly extended flange 125 formed on the collar 127 on which is threaded the locking ring 126. An inwardly projecting flange 128 is formed on the collar 127 and secured in sealing relation to this flange 128 is one end of the flexible sealing member 129, the other end of which is secured in sealing relation to the inwardly turned flange 131 formed on the sleeve 130. This member 130 is secured to the collar 132 in sealing relation and positioned within a recess formed in the collar 132 are roller bearings or pins 133 against which engages the periphery of the roller or head 137 which is mounted eccentrically on the shaft 110 and retained in position by means of the nut 138. The pins 133 are retained in position by the retaining ring 134 against which engages the yoke 91' which is retained in position by the ring 135 having the axially directed flange 136 at its outer end. The yoke 91' is mounted and functions as is the yoke 91 shown in Fig. 7. The shaft 110 is the driven shaft and the driving shaft 143 is provided with the eccentrically mounted head or roller 140 which engages against the roller bearings or pins 141 spaced by the spacer 142 and retained in position by the ring 146. The shaft 143 is journalled in the bushing 145 and provided with the pulley or drive wheel 144. It is believed that the operation of the sealing member shown in Fig. 8 will appear from the description which has already been given as to the structure shown in Fig. 5. It will be noted that the roller or head 137 is spaced from the roller or head 140 by the partition 139 which is formed integral with the collar 132. This permits the assembly in the collar 132 from opposite sides thereof.

Figure 9:
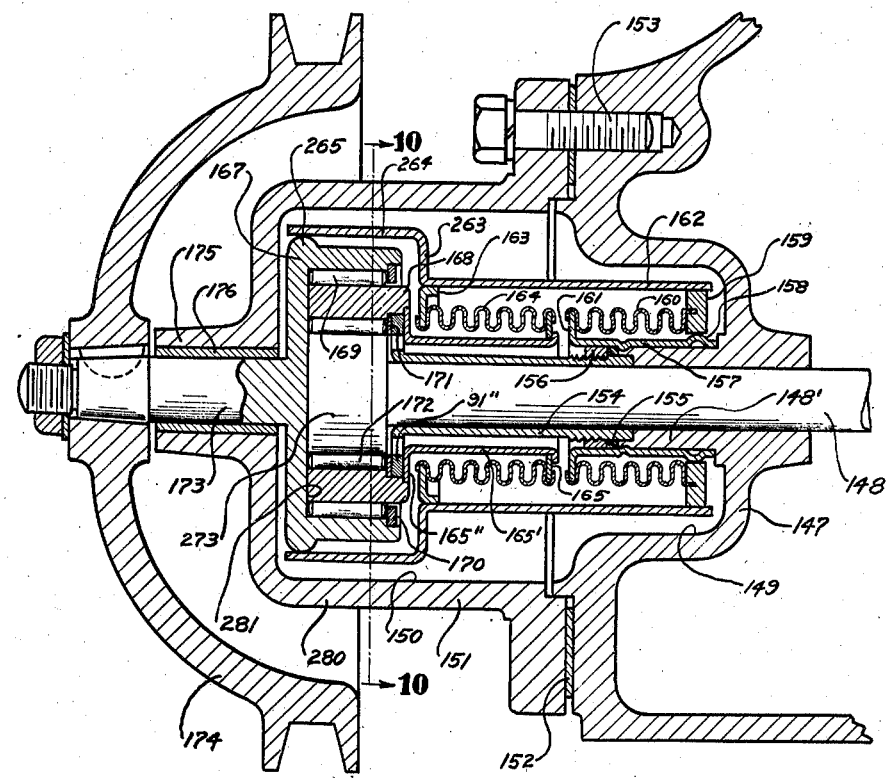
Fig. 9 is a longitudinal, central, vertical sectional view of the invention in a slightly further modified form.
Figure 10:
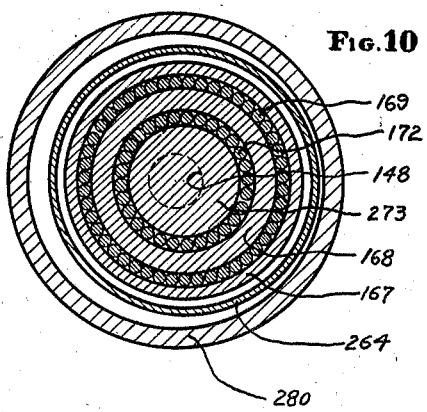
Fig. 10 is a sectional view taken on line 10—10 of Fig. 9.

In Fig. 9 and Fig. 10 I have shown a form which illustrates the use of a drive such as shown in Fig. 1, and other features resembling the different forms which have already been illustrated. The shaft 148 projects through the end wall 147 of the housing, this end wall being inset to provide the recess 149 to cooperate with the recess 150 formed in the housing 151 to provide a chamber. This housing 151 is held against the gasket 152 and on the end wall of the housing 147 by means of the bolts 153. A sleeve 154 snugly embraces the shaft 148. Projected inwardly from the end wall 147 is the neck 148' against which is compressed the gasket 155 by means of the collar 156 threaded on the sleeve 154. A sleeve 157 embraces the neck 148' and is provided at one end with the outwardly pressed bead 158 on which rests the ring or collar 159 which seats in and is secured to the sleeve 162. Secured at one end to the collar 159 is the flexible sealing member 160 and the opposite end thereof is secured to the radially outwardly projecting flange 161 on the sleeve 157. The sleeve 162 engages at its inner surface the periphery of the collar 163 to which is secured one end of the flexible sealing member 164, the opposite end thereof being secured to the radially projecting collar 165 mounted on the sleeve 165'. This sleeve 165' is provided at its opposite end with the radially projecting flange 165''. Projecting outwardly from the sleeve 162, adjacent one end, is the flange 263 angularly turned to provide the axially turned portion 264 which embraces and rests upon the bead 265 formed on the cup-shaped driving member 167. This member embraces the drive collar 168 and is spaced therefrom by the pins 169 which are retained in position by the ring 170. Positioned within the driving collar 168 and spaced therefrom by the pins 172 which are retained in position by the ring 171 is the eccentric roller or head 273 which is fixedly mounted on and preferably formed integral with the shaft 148. Formed preferably integral with the driving collar 167 and projecting eccentrically outwardly therefrom is the shaft 173 which projects through the bushing 176 mounted in the boss 175 formed on the end wall of the housing 280. A pulley 174 is fixedly mounted upon the shaft 173. The recess 281 formed in the driving collar 167 is eccentric to both of the shafts 173 and 148. The driving head 168 is also eccentric to both of these shafts as is likewise the roller or head 273. The drive is effected in substantially the same manner as is the drive described for Fig. 1 and the functions and operations of the sealing members 160 and 164 are as previously described. The yoke 91'' is constructed and functions in the manner of the yoke 91 shown in Fig. 5 and in Fig. 7.

It will be noted that in each type of structure one of the flexible sealing members is connected at one end to the driving element, that is to the head 28 shown in Fig. 1, to the collar 85 shown in Fig. 5, to the collar 132 shown in Fig. 8 or to the sleeve 165' and thereby to the collar 168 shown in Fig. 9, and at its opposite end a floating body. The other tubular member is also connected at one end to a stationary body and at its opposite end to the floating body.

It will also be noted that in Fig. 1 the tubular member 27 engages at one end rockably with the stationary part 26. This same engagement is clearly illustrated in the structure shown in Fig. 5 as the part 95 rockably engages the part 81. In the structure shown in Fig. 8 and Fig. 9 the same engagement may be said to be effected. The ribs 158 may be considered to be a part of the stationary body and the collar 159 may be considered to be a part of the member 162. Likewise, in Fig. 8, the part 114 may be considered to be a part of the tubular body 120.

It will also be noted that in the form shown in Fig. 1 one end of the tubular member 24 is connected to the angularly turned portion 23 of the member 22 and this in turn is angularly turned as at 21 and connected to the stationary body 16. It may, therefore, be considered that one end of the member 24 is connected to the stationary body 16, as this is the equivalent of the direct connection shown in the case of the member 94 to the rib 93 and the equivalent of the connection of one end of the member 118 to the flange or ring 119 shown in Fig. 8 or one end of the member 160 connected to the outwardly projecting flange 161. It will also be noted that the floating tubular body is of a rigid type of construction and that the two flexible sealing members are surrounded by this sleeve in the form shown in Figs. 5, 8 and 9, while in the form shown in Fig. 1 the sleeve is surrounded by the flexible members.

While I have illustrated and described the preferred form of construction, I do not wish to limit myself to the precise details of structure shown, but desire to avail myself of such variations and modifications as may come within the scope of the appended claims.

Having thus described my invention, what I claim as new and desire to secure by Letters Patent is:

1. In combination, a shaft driving member movable in an orbit; a shaft extending axially of said member and driven thereby; a bearing for said shaft, said shaft extending through said bearing; a sealing mechanism for sealing against escape of fluids passing through said bearing around said shaft comprising a flexible member surrounding a portion of said shaft; means connected in sealing engagement with one end of said flexible member for transmitting the movement of said driving member to said end of said flexible member; a rockable sleeve directly engaging and embracing said bearing at one end and surrounding said shaft and connected in sealing relation to the opposite end of said flexible member said flexible member overlying a portion of said sleeve; a second flexible member surrounding a portion of said shaft; and a stationary member connected in sealing relation to one end of said second flexible member; the opposite end of said flexible member being connected to the opposite end of said sleeve and overlying a portion thereof.

2. In combination, a driving element for driving a shaft and movable in an orbit; rotatable means for moving said element in said orbit; a driven shaft extending axially of said element and rotatable upon the orbital movement of said element; a stationary member, said shaft being rotatably projected through said stationary member and journalled therein; a tubular body surrounding said shaft; means cooperating with said tubular body for establishing loose contact of the same at one end with said driving element; means for establishing loose connection of the opposite end of said tubular body with said stationary member; a tubular flexible member embracing a portion of said tubular body; means connecting in sealing relation one end of said tubular flexible member with said driving element, the opposite end of said tubular flexible member being connected in sealing relation to one end of said tubular body; a second flexible tubular member surrounding a portion of said tubular body and connected at one end in sealing relation to the opposite end of said tubular body; and means connecting in sealing relation the opposite end of said second flexible tubular member to said stationary member.

3. In combination, a stationary member; a rotatable shaft projected through said member; a driving element adapted for movement in an orbit, and adapted upon movement in its orbit for effecting a rotation of said shaft; means for moving said driving element in said orbit; a tubular body surrounding a portion of said shaft, one end of said tubular body rockably engaging against said stationary member; a flexible tubular sealing member surrounding a portion of said shaft, one end of said sealing member being connected in sealing relation to said driving element and the other end being connected in sealing relation to said tubular body; and a second flexible tubular sealing member surrounding another portion of said shaft, one end thereof being connected in sealing relation to the opposite end of said tubular body and the opposite end thereof being connected in sealing relation to said stationary member.

4. In a seal of the class described, a stationary body; a rotatable shaft projected through said body; a driving element movable in an orbit and adapted upon movement in said orbit for rotating said shaft; means for moving said driving element in said orbit; a flexible tubular sealing member surrounding a portion of said shaft, one end of said sealing member being secured in sealing relation to said driving element; a second tubular flexible sealing member, one end of said second member being connected in sealing relation to said stationary body, said flexible tubular members being in substantial alignment and spaced apart; and a tubular member surrounding said shaft and spanning the distance determined by said flexible sealing members, the opposite ends of each of said sealing members being connected to said spanning tubular member, each of said flexible tubular members overlying a portion of said spanning of tubular member.

5. In a seal of the class described, a stationary body; a rotatable shaft projected through said body; a driving element movable in an orbit and adapted upon movement in said orbit for rotating said shaft; means for moving said driving element in said orbit; a flexible tubular sealing member surrounding a portion of said shaft, one end of said sealing member being secured in sealing relation to said driving element; a second tubular flexible sealing member, one end of said second member being connected in sealing relation to said stationary body, said flexible tubular members being in substantial alignment and spaced apart; and a tubular member surrounding said shaft and spanning the distance determined by said flexible sealing members, the opposite ends of each of said sealing members being connected to said spanning tubular member, adjacent its opposite ends, each of the flexible tubular members overlying over a portion of said spanning tubular member.

6. In a seal of the class described, a stationary body; a rotatable shaft projected through said body; a driving element movable in an orbit and adapted upon movement in said orbit for rotating said shaft; means for moving said driving element in said orbit; a flexible tubular sealing member surrounding a portion of said shaft, one end of said sealing member being secured in sealing relation to said driving element; a second tubular flexible sealing member surrounding a portion of said shaft, one end of said second member being connected in sealing relation to said stationary body; and a tubular member surrounding said shaft and spanning the distance determined by said flexible sealing members, the opposite ends of each of said sealing members being connected to said spanning tubular member, adjacent its opposite ends, said tubular spanning member rockably engaging at one end said stationary member and being free at its opposite end for effecting rocking movement.

7. In a seal of the class described, a stationary member; a shaft rotatably projected through said member; a driving element adapted for movement in an orbit, and adapted upon movement in said orbit for effecting a rotation of said shaft; means for moving said driving element in said orbit; a flexible sealing member surrounding a portion of said shaft and connected at one end in sealing relation to said element; a floating body surrounding a portion of said shaft and connected at one end in sealing relation to the opposite end of said sealing member; and flexible means for connecting the opposite end of said floating body in sealing relation to said stationary member, said sealing member and said flexible means, each overlying a portion of said floating body.

8. In a device of the class described, a stationary member; a shaft rotatably projected through said member; a driving element movable in an orbit and adapted upon movement in an orbit for rotating said shaft; means for moving said driving element in said orbit; a tubular body surrounding a portion of said shaft and engaging, adjacent one end, said stationary body and rockable at said engagement for permitting free movement of the opposite end of said body relatively to said shaft, said tubular body being of greater inside diameter than the outside diameter of said shaft; a flexible tubular sealing member surrounding a portion of said shaft and connected in sealing relation at one end to said stationary member and at the opposite end to the engaging end of said tubular body; and a tubular flexible sealing member surrounding a portion of said shaft and connected in sealing relation to the opposite end of said tubular floating body and at its opposite end in sealing relation to said driving element.

9. In a device of the class described, a stationary member; a rotatable shaft projected through said member; a driving element movable in an orbit and adapted upon movement in an orbit for effecting rotation of said shaft; means for moving said driving element in said orbit; a sleeve surrounding a portion of said shaft, one end of said sleeve rockably engaging against said stationary member and rockable on its point of engagement; means for transmitting to the opposite end of said sleeve the orbital movement of said element; a flexible tubular sealing member surrounding a portion of said shaft and one end thereof being connected to said driving element in sealing relation and the opposite end thereof being connected to the non-engaging end of said sleeve in sealing relation; a second flexible tubular sealing member surrounding a portion of said shaft and one end thereof being connected to said stationary member in sealing relation and the other end thereof being connected to said sleeve at its engaging end in sealing relation.

10. In combination, a stationary member; a rotatable shaft projected through said member; a driving element adapted for movement in an orbit, and adapted upon movement in its orbit for effecting a rotation of said shaft; means for moving said driving element in said orbit; a tubular body surrounding a portion of said shaft, one end of said tubular body rockably engaging against said stationary member; a flexible tubular sealing member surrounding a portion of said shaft, one end of said sealing member being connected in sealing relation to said driving element and the other end being connected in sealing relation to said tubular body; a second flexible tubular sealing member surrounding a portion of said shaft, one end thereof being connected in sealing relation to the opposite end of said tubular body and the opposite end thereof being connected in sealing relation to said stationary member; and movable means for preventing rotation of said driving element.

OWEN F. NELSON.